Dec. 15, 1959 W. P. OEHLER ET AL 2,917,012
DISK FERTILIZER FURROW OPENER ATTACHMENT FOR PLANTERS
Filed Jan. 29, 1957
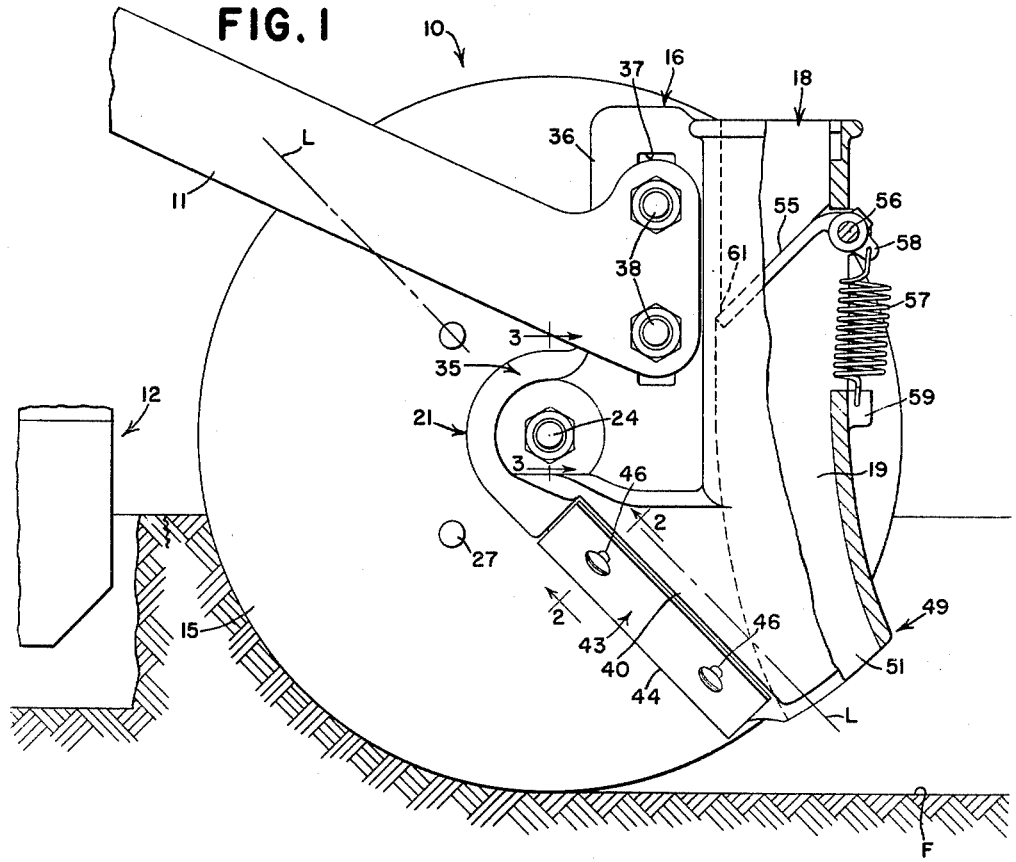
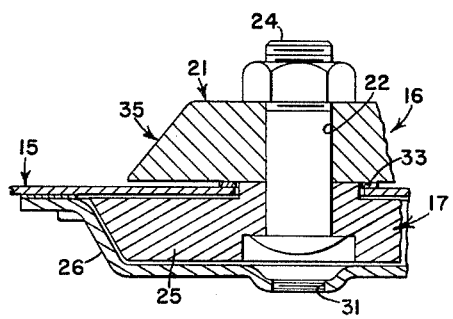
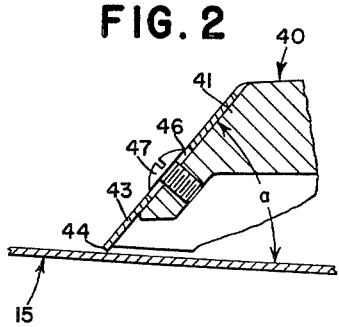
INVENTORS
WILLIAM P. OEHLER
ARTHUR J. IMMESOETE
EDWIN W. REEDER
BY
ATTORNEY

United States Patent Office 2,917,012
Patented Dec. 15, 1959

2,917,012

DISK FERTILIZER FURROW OPENER ATTACHMENT FOR PLANTERS

William P. Oehler, Arthur J. Immesoete, and Edwin W. Reeder, Moline, Ill., assignors, by mesne assignments, to Deere & Company, a corporation of Delaware Application January 29, 1957, Serial No. 636,945

3 Claims. (Cl. 111—87)

The present invention relates generally to agricultural implements and more particularly to fertilizer furrow openers adapted to be used in conjunction with planters and the like.

The object and general nature of the present invention is the provision of a fertilizer furrow opener of the flat disk type so constructed and arranged as to form a relatively narrow fertilizer-receiving furrow relatively closely alongside the seed furrow and capable of distributing relatively large quantities of fertilizer, either liquid or solid, without disturbing the seed furrow or the seed deposited therein.

Another feature of this invention is the provision of a disk fertilizer furrow opener so constructed and arranged that any slight displacement of the disk, such as might occur when the soil pressure against the disk in operation may be greater than normal, as when operating under hard ground conditions, will not cause the disk to rub or bind against any part of the associated fertilizer boot.

More specifically, it is a feature of the present invention to provide a disk fertilizer furrow opener unit, including a substantially flat disk furrow opener and an associated fertilizer boot casting, which forms the support rotatably receiving the disk, with the boot casting being disposed entirely to the rear of the forward portion of the disk so that if the forward portion of the disk should be deflected slightly, as by excessive soil pressure, there will be no adjacent portions of the fertilizer boot casting against which the so-deflected disk might rub. Rubbing of the disk against the stationary part, such as an adjacent portion of the boot casting, would greatly increase the resistance to rolling and, in fact, might entirely stop the rotation of the disk. In this case the proper functioning of the disk furrow opener would be seriously impaired.

Another feature of this invention is the provision of a scraper plate attached to a downwardly and rearwardly extending portion of the fertilizer boot casting which plate, and the adjacent portion of the boot casting, lies approximately along or closely adjacent the generally diametrical line about which the disk deflects when encountering excessive soil pressure in operation. In this way, the occurrence of some disk deflection will not cause any part of the disk to rub against the scraper plate, and locating the latter on the line of bend or deflection, permits adjustment of the plate into close adjacency to the disk to thereby increase the efficiency of the plate in performing its soil removing function.

Another feature of this invention resides in the particular formation of the fertilizer boot casting in that the conduit for the fertilizer is brought downwardly to a point below the adjacent edge of the disk so that there is substantially no possibility of liquid fertilizer, when that is the kind of fertilizer dispensed, splashing against the back side of the disk, wetting the same and causing excessive amounts of soil to adhere to the disk. An excessive amount of soil build-up on the back of the disk greatly increases the resistance to turning of the disk with the resulting disadvantages mentioned above.

Still further, another feature of this invention is the provision of a conoidal or outwardly convergent periphery on the disk-receiving portion of the fertilizer boot casting, which acts to shed soil, small rock fragments and the like, generally directing such material laterally away from the disk so as to prevent such material from finding its way into the bearing by which the disk is rotatably mounted on the supporting boot casting.

These and other objects and advantages of the present invention will be apparent to those skilled in the art after a consideration of the following detailed description, taken in conjunction with the accompanying drawings in which the preferred structure, chosen to illustrate the principles of the present invention, have been shown.

In the drawings:

Fig. 1 is a side view of a fertilizer attachment for planters incorporating the present invention.

Fig. 2 is an enlarged fragmentary sectional view, taken generally along the line 2—2 of Fig. 1.

Fig. 3 is an enlarged fragmentary sectional view taken generally along the line 3—3 of Fig. 1, illustrating the soil and stone shedding configuration of the disk-receiving portion of the boot casting.

Referring first to Fig. 1, the fertilizer attachment is indicated in its entirety by the reference numeral 10 and is shown as connected by a generally fore-and-aft extending arm 11 to an associated planter which is represented by the rear portion of a seed furrow opener runner or shoe 12. The planter, represented by the runner 12, is of conventional construction. The runner 12 forms a seed furrow for receiving seed selected by the mechanism of the planter. In operation, the seed furrow opener opens a furrow to receive the seed, and then the fertilizer attachment 10 opens the fertilizer-receiving furrow closely alongside and usually deeper than the seed furrow and deposits fertilizer in either a series of short bands or in a continuous band closely alongside the seed in the seed furrow. It is essential, however, to keep the fertilizer from coming into direct contact with the seed, either by spilling over onto the seed in the seed furrow or by disturbing the soil adjacent the seed furrow so that the fertilizer may filter through the disturbed soil and come into contact with the seed. The fertilizer attachment of the present invention is especially constructed and arranged to form only a relatively narrow fertilizer-receiving furrow without appreciably disturbing the seed in the seed furrow, yet the fertilizer furrow is adapted to receive heavy quantities of fertilizer that are desirable under present-day planting practices.

The fertilizer attachment 10 of the present invention comprises a substantially flat furrow opening disk 15 and a supporting fertilizer boot 16 on which the disk 15 is mounted for rotation, as by bearing means 17 (Fig. 3). The fertilizer boot is preferably in the form of a casting, as is conventional in this art, but obviously it may be made in other ways, and hence the term "casting" is to be considered as applicable to fertilizer receiving and disk supporting means formed in other ways and of materials other than cast iron. The fertilizer boot 16 is formed with a generally rear fertilizer conduit section 18 that is disposed generally vertically, as shown in Fig. 1, presenting a passageway 19 to receive fertilizer and conduct or direct the same into the furrow opened by the disk 15. The member 16 also serves as means to support the rotatable disk 15, and to this end the boot casting 16 is formed with a forwardly extending section 21 that is apertured, as at 22, Fig. 3, to receive a bolt 24 by which a bearing member 25, supporting the disk 15, is fixed to the member 16. The disk 15 includes a bearing cup 26 that is secured, as by rivets 27, to and forms a part of the disk 15, and the cup 26 is shaped so as to snugly receive the associated bearing member 25. The cup 26 is centrally apertured as at 31, to receive a lubricant fitting (not shown) which normally closes the opening 31 and provides for forcing lubricant into the space between the cup 26 and the bearing 25. As illustrated, the latter is preferably in the form of a white iron part, which is very hard and the same is locked to the supporting portion 21 and held against rotation relative thereto by the bolt 24. A lubricant tight sealing gasket 33 is disposed between the inner face of the disk 15 and the adjacent inner face of the disk supporting boot section 21.

In order to prevent soil, rock fragments and the like from working into the disk bearing, the supporting section 21 is made in a tapered or conical configuration, the peripheral portion of the supporting section 21 extending laterally away from the disk in a laterally outwardly converging shape, as will be seen in Figs. 1 and 3. This laterally outwardly sloping surface, indicated generally at 35, directs soil and other material laterally away from the disk and therefore prevents to a large extent any entrance of such material into the space between the disk 15 and the portion 21 of the supporting boot casting 16. The forward portion of the latter, lying in front of the upper portion of the conduit section 18 and above the disk-receiving section 21, is formed as a generally vertical forwardly extending fin 36 that is slotted, as indicated at 37, to receive a pair of attaching bolts 38 carried by the rear part of the supporting arm 11. By virtue of the slotted section 37, and the associated bolt 38, the vertical position of the boot casting 16 may be adjusted relative to the arm 11 so as to place the disk 15 in a desired position relative to the planter runner 12. For example, in one commercial form of this invention, the fertilizer unit may be raised to a point where the lower part of the disk 15 is substantially on the same level as the lower part of the runner 12, and hence the fertilizer furrow is formed at about substantially the same level as the seed furrow. By loosening the bolts 38 and shifting the support or boot casting 16 downwardly, the fertilizer may be placed an inch or two below the seed, and an appreciable distance to one side of the seed as is presently deemed desirable.

It will be noted that the disk 15 is flat, rather than being dished or concave, as is conventional practice in, for example, disk harrows or the like, and this is for the purpose of forming a fertilizer-receiving furrow that is as narrow as practical. Dished or concave disks cannot, by virtue of their configuration, be used to form narrow furrows. This, according to the principles of the present invention, has two advantages. First, the flat disk, forming only a very narrow furrow for the fertilizer, has little tendency to disturb the seed furrow, acting laterally only to the extent of insuring that soil is shifted laterally only sufficient to adequately cover the seed deposited in in the seed furrow by the unit 12. Secondly, utilizing a flat disk and setting it at a relatively small angle to the direction of forward travel, imposes only limited amounts of eccentric loading onto the bearing means by which the disk 15 is supported on the boot member 16. However, whenever flat disks are used, there sometimes occurs a tendency for the soil pressure acting against the forward portion of the flat disk, especially when operating under difficult conditions, such as hard soil and the like, to deflect the forward portion of the disk to a slight degree in a generally lateral direction. Generally speaking, looking at Fig. 1, the axis of bending or deflection of the disk 15 under such conditions takes place about a line indicated at L—L in Fig. 1. In order to prevent any rubbing or binding of the disk against adjacent parts under such conditions, I have formed the lower forward portion of the fertilizer boot member 16 in such a way that the lower forward part of the member 16 lies approximately in the aforesaid line L—L so that even if the aforesaid bending or lateral deflection of the disk 15 takes place such lateral displacement of the forward lower portion does not tend to cause the same to rub or bind against some part of the member 16, as might occur if a shoe or some other part of the member 16 were extended forwardly to a point adjacent the forward edge of the fertilizer furrow opening disk.

The above mentioned downwardly and rearwardly extending portion of the disk-supporting boot member 16 is indicated in Figs. 1 and 2 by the reference numeral 40, and as best shown in Fig. 2, this portion includes a substantially flat elongated surface 41 that lies at an acute angle shown at a, Fig. 2, relative to the plane of the disk 15. This flat surface 41, as can be seen from Fig. 1, extends generally tangentially relative to the tapered or laterally outwardly converging conoidal section 35, and is shaped to receive a flat elongated scraper plate 43, the forward edge of which is indicated at 44 and lies in close scraping relation with respect to the adjacent face of the disk 15. To secure the plate 43 to the section 40 of the member 16, the plate is provided with a pair of slots 46 and screws 47 extend through the slots 46, which extend transversely with respect to the plate 43, so as to serve as means adjustably fixing the plate 43 to the fertilizer boot member 16. By virtue of the screws 47 and slots 46, the scraper plate 43 may be brought as closely as possible to the adjacent surface of the disk 15, and yet the disk 15 will not rub or bind thereagainst, even though the forward section may be deflected laterally, as by excessive soil pressure, this being true because the scraping or active edge of the plate 43 lies substantially in what might be termed the neutral axis of bending or lateral deflection of the disk 15.

Reference was made above to the fact that the fertilizer attachment of the present invention is particularly adapted to handle not only dry fertilizer but also liquid fertilizer. In the event liquid fertilizer is used, it is especially important to prevent any contact of the liquid fertilizer with the back side of the disk 15, which is the side of the disk that is visible in Fig. 1. In order to keep liquid fertilizer from splashing against the back sides of the disk, the fertilizer conduit 19 is extended downwardly to a point generally below the adjacent edge of the disk 15, a relation that is indicated in Fig. 1 by the reference numeral 49. From this figure it will be seen that the laterally inward wall 51 of the fertilizer conduit section 18 at the lower end thereof discharges the liquid fertilizer into the fertilizer furrow but prevents the liquid from coming into contact with the back face of the disk 15.

When dry fertilizer is distributed, a valve 55 is provided for controlling the flow through the fertilizer conduit channel 19. The valve 55 is pivoted on a pin 56 carried by the member 16 in any suitable way, and a spring 57 is connected between an apertured lug 58 that forms a part of the valve 55 and an apertured lug 59 that is formed on the rear part of the member 16. The spring 57 normally holds the valve closed against a stop shoulder 61 that is formed on the front portion of the fertilizer channel or passageway 19. When a continuous delivery of fertilizer is desired the valve 55 is held in an open position by any suitable means.

Another important feature of the present invention, which will be apparent from Fig. 1, lies in the particular disposition and configuration of the boot member 16. This feature is the location of the lower portion of the member 16 and associated parts well above the bottom of the disk 15. Since the lower end of the scraper plate 43 and the lower end 51 of the fertilizer channel are disposed well above the bottom of the fertilizer furrow, indicated at F in Fig. 1, the disk 15 always has traction at its lower edge, which sometimes is lost in the construction in which the shoes and other parts associated with a disk furrow opener extends downwardly as far or substantially as far as the lower edge of the disk itself. By always having adequate traction on the bottom of the furrow F, continuous rotation of the disk 15 in operation is assured, While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A fertilizer furrow opener unit adapted to be operated back of and to one side of a seed furrow opener, said fertilizer furrow opener unit comprising a substantially flat disk set at a slight angle relative to the direction of travel so as to form a narrow furrow in the soil at one side of the furrow formed by the seed furrow opener, a fertilizer boot casting comprising a generally vertical conduit section and a forwardly extending portion on which said disk is journaled for rotation, the peripheral section of said forwardly extending portion being tapered to form a conoidal portion that extends laterally away from said disk in converging relation so as to shed soil and the like and direct the same away from the disk, the lower part of said boot casting comprising a generally flat portion extending downwardly and rearwardly from said tapered portion in generally tangential relation and in substantial parallelism with said disk, a flat scraper plate disposed against said flat portion and having an edge lying in scraping relation with said disk, and means fixing said scraper plate to said flat portion in different positions relative to said disk and transversely of said flat portion.

2. A fertilizer furrow opener unit adapted to be operated back of and to one side of a seed furrow opener, said fertilizer furrow opener unit comprising a disk set at a slight angle relative to the direction of travel so as to form a narrow furrow in the soil at one side of the furrow formed by the seed furrow opener, a fertilizer boot casting comprising a generally vertical conduit section disposed at the rear of said boot casting and a forwardly extending portion on which said disk is journaled for rotation, said boot casting being located so that the conduit section thereof is disposed forward of the rearmost edge of the disk and said conduit section having a rearwardly and downwardly curving portion that extends downwardly to points below the adjacent edge of the disk but terminates a distance above the horizontal line that passes through the lowermost edge of the disk, the lower part of said boot casting comprising a blade-receiving portion disposed in front of the lower part of said conduit section and extending generally upwardly and forwardly from the lower forward portion of said conduit section toward said disk-receiving portion, said blade-receiving portion having a generally downwardly and forwardly facing portion lying in a plane disposed at an angle to the adjacent surface of the disk, said blade-receiving part also facing laterally outwardly at an angle thereto and relatively closely adjacent a diametrical line passing through the disk axis in an upwardly and forwardly extending direction, and a flat scraper blade disposed against said blade-receiving portion and having an edge lying in scraping relation with said disk.

3. A fertilizer furrow opener unit adapted to be operated back of and to one side of a seed furrow opener, said fertilizer furrow opener unit comprising a disk set at a slight angle relative to the direction of travel so as to form a narrow furrow in the soil at one side of the furrow formed by the seed furrow opener, a fertilizer boot casting comprising a generally vertical conduit section and a forwardly extending portion on which said disk is journaled for rotation, the peripheral section of said forwardly extending portion being tapered to form a conoidal portion tapering convergingly away from said disk so as to shed soil and the like and direct the same away from the disk, the axis of said tapered conoidal portion coinciding with the disk axis, the lower part of said boot casting comprising a generally flat portion extending at an angle to the plane of the disk downwardly and rearwardly from said tapered portion in tangential relation with respect to said conoidal portion, and a flat scraper plate disposed against said flat portion and having an edge lying in scraping relation with said disk, said blade receiving portion extending downwardly and rearwardly adjacent a diametrical line that passes upwardly and forwardly through the disk center.

References Cited in the file of this patent

UNITED STATES PATENTS

| | | |
|---|---|---|
| 610,316 | Arnett | Sept. 6, 1898 |
| 738,816 | Kindsvater | Sept. 15, 1903 |
| 776,504 | Faas | Dec. 6, 1904 |
| 951,741 | Pattison et al. | Mar. 8, 1910 |
| 1,167,551 | Fowle | Jan. 11, 1916 |
| 1,170,696 | Squier | Feb. 8, 1916 |